United States Patent Office 2,821,553
Patented Jan. 28, 1958

2,821,553

PREPARATION OF MUCOCHLORIC ACID

Andrew P. Dunlop, Riverside, and Edward Sherman, Chicago, Ill., assignors to The Quaker Oats Company, Chicago, Ill., a corporation of New Jersey No Drawing. Application November 23, 1954
Serial No. 470,826

3 Claims. (Cl. 260—535)

This invention relates to a process of preparing mucochloric acid (alpha, beta-dichloro-beta-formylacrylic acid) and has for an object the provision of a method for preparing mucochloric acid directly from furfural utilizing a simple chlorinative oxidative step.

Mucochloric acid is known to be useful as an intermediate in the synthesis of various types of organic compounds, as may be readily appreciated from the reactive chlorine groups, the double bond and the carboxyl and carbonyl groups in the compound. Mucochloric acid is particularly useful as a starting material for producing dichloromaleic acid by oxidation, the latter acid being useful as an intermediate in the resin industry. Furthermore, mucochloric acid is useful as an insecticide and may be incorporated as one ingredient in commercial insecticidal compositions.

Mucochloric acid is a known chemical compound and has been produced by a variety of methods, such as by the action of chlorine on furoic acid, by reacting furoic acid and hydrochloric acid in the presence of manganese dioxide, by treating beta, gamma-dichlorofuroic acid with an excess of bromine water, by heating beta, gamma-dichlorofuroic acid with nitric acid, and by heating furfural with manganese dioxide and hydrochloric acid. However, these prior art methods of preparation all involve detailed multistep processes. Certain of the prior art processes suggested above result in the formation of undesirable contaminants that may be difficult to separate from mucochloric acid in the final reaction product. Also, in certain of the prior art processes the yield of mucochloric acid is so low that the procedures are suitable only as laboratory methods and the recovery of the desired mucochloric acid can be effected only by expensive techniques which may involve the extraction of the reacted mother liquor by means of a selective solvent.

Accordingly, it is an important object of the present invention to provide a novel simplified method for the production of mucochloric acid which avoids the detailed complexities of the prior art processes.

It is a further object of this invention to provide a novel process for the preparation of mucochloric acid which results in the production of the desired acid in a high state of purity and in high yields.

It is a still further object of this invention to provide a direct method of forming mucochloric acid without the substantial formation of other compounds as side reaction products.

A still further object of this invention is the provision of a process for producing mucochloric acid which utilizes simple equipment and depends only upon readily controllable operating conditions.

An additional object of this invention is the provision of a process for preparing mucochloric acid which is readily adaptable to continuous operations.

Further and additional objects of this invention will become apparent from a consideration of the following description and the appended claims.

In accordance with one embodiment of this invention mucochloric acid is prepared by reacting furfural and chlorine in an aqueous solution of hydrochloric acid. The resulting reaction may be described by the following equation:

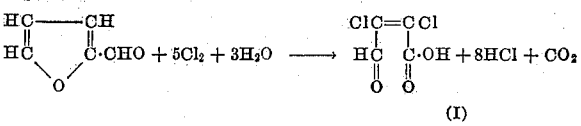

(I)

In the foregoing equation the mucochloric acid has been designated as a straight chain compound. However, it will be understood that the compound having the formula I indicated in the foregoing equation may be in equilibrium with a ring type compound having the formula:

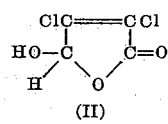

(II)

The process of this invention may be readily carried out by adding chlorine and furfural in increments or preferably continuously to an aqueous hydrochloric acid solution. The reaction may be effected at substantially atmospheric pressure and at a temperature between about 40° and 110° C. As will be apparent from the foregoing equation, 5 moles of chlorine gas are required for each mole of furfural reacted. However, in order to obtain high yields, it has been discovered that a stoichiometric excess of chlorine should be employed and the molar ratio of chlorine to furfural should be between about 6 to 1 and about 20 to 1 in order to obtain satisfactory results. Preferably the temperature of the reaction is between 60° and 100° C. and the molar ratio of the chlorine to the furfural is between about 10 to 1 and about 14 to 1.

After the reaction has been completed to an extent where substantial quantities of mucochloric acid are formed, the reaction mixture may be chilled to a temperature substantially below the reaction temperature whereby the mucochloric acid separates as a solid precipitate. The precipitate is then separated from the mother liquor by filtering, centrifuging, settling or the like. An important feature of this invention is that the mother liquor and washings from the mucochloric acid separating step are reutilized in the reaction zone as the base medium to which the chlorine and furfural are added. By use of such mother liquor, the over-all yields of mucochloric acid are substantially increased in a continuous operation since any mucochloric acid not precipitated from the mother liquor will be recycled to the reaction zone for subsequent recovery in a further operation. Generally speaking, the cyclic process can be carried out by continuously withdrawing a small fraction of the reaction mixture from the reaction zone, chilling the small fraction to precipitate the mucochloric acid, separating the precipitate from the mother liquor, and recycling the mother liquor to the reaction zone. The degree of chilling the mother liquor is not particularly critical except that it should be sufficient to effect the desired precipitation. Normally such chilling would be below about 30° C.

For a more complete understanding of this invention, reference will now be made to several specific examples.

EXAMPLE 1

A 2-liter round bottom flask was equipped with a reflux condenser, stirrer, chlorine, dispersing tube and means for adding furfural and chlorine incrementally or continuously. The flask was charged with 500 milliliters of concentrated hydrochloric acid and brought to a temperature of 70° C. At this point chlorine gas was introduced continuously through the disperser and below the liquid level at the rate of about 1088 milliliters per minute. Furfural was then continuously introduced below the level of liquid in the reaction flask and at the rate of 20 grams per hour. These conditions were maintained in the reaction flask for a total of 4 hours, at the end of which the reaction solution was observed to be almost water white in color. Upon chilling the solution, mucochloric acid precipitated as a white crystalline solid which was easily separated by filtration and washing with cold water. In duplicate runs the total yield was found to be 60.5 percent and 62.4 percent of the theoretical.

EXAMPLE 2

Using the equipment described in Example 1, the experiment was repeated a number of times except that the initial acid solution added to the 2-liter flask was after the first run a 500 milliliter batch of acid-reacting mother liquor from a previous batch from which the mucochloric acid had been precipitated and separated as above described. 12 consecutive runs were made using this procedure, isolating mucochloric acid from each run, and combining the mother liquor and washings as the acid-reacting medium for the succeeding run. The rates of furfural addition and chlorine addition were approximately the same as in Example 1. The results of these succesive runs are tabulated in Table I.

Table I

| Run No. | Total Furfural Added, grams | Yield of Mucochloric Acid | |
|---|---|---|---|
| | | Grams | Percent of theory |
| 1 | 40 | 28.6 | 40.5 |
| 2 | 40 | 49.5 | 70.4 |
| 3 | 40 | 43.8 | 62.3 |
| 4 | 40 | 62.6 | 89.1 |
| 5 | 40 | 58.0 | 82.5 |
| 6 | 40 | 47.9 | 68.2 |
| 7 | 40 | 51.9 | 73.8 |
| 8 | 40 | 40.4 | 57.5 |
| 9 | 40 | 52.4 | 74.5 |
| 10 | 80 | 88.8 | 63.1 |
| 11 | 160 | 135.8 | 48.2 |
| 12 | 160 | 181.5 | 64.5 |
| Concentration of last mother liquor | | 31.8 | |
| Totals | 760 | 873.0 | 65.1 |

Thus it will be apparent that by using the combined mother liquor and washings as the reaction medium for the chlorine and furfural, increased yields of the desired product are obtainable.

It will be appreciated from a consideration of Table I that certain advantages are to be obtained by carrying the reaction out in a continuous manner under conditions such that the mother liquor and washings are combined and returned to the reaction zone as the base medium into which the furfural and chlorine are continuously added. Thus by such a procedure the reaction zone may be maintained under the conditions previously indicated, with furfural and chlorine being continuously added or added in increments, and a portion of the reaction mixture may be continuously withdrawn from the reaction zone. The withdrawn stream of liquor may be chilled suitably to a temperature below about 30° C. to precipitate the mucochloric acid which is separated by filtration or otherwise. The mucochloric acid precipitate is washed and the mother liquor, to which may be added a portion or all of the washings, is recycled to the reaction zone. Generally speaking, the total amount of material being subjected to the mucochloric acid recovery step may amount to between 5 and 15 percent of the volume of the mixture undergoing reaction in the reaction zone.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process for the preparation of mucochloric acid which comprises conjointly adding chlorine and furfural in a molar ratio of at least 6 to 1 to a concentrated aqueous solution of hydrochloric acid at a temperature of from 60–110° C., cooling the resulting solution to precipitate mucochloric acid, and separating the precipitate from the solution.

2. A continuous process for the preparation of mucochloric acid which comprises conjointly passing chlorine and furfural in a molar ratio of at least 6 to 1 into a concentrated aqueous solution of hydrochloric acid maintained at a tempearture between about 40 and 110° C. in a reaction zone, cooling a portion of the resulting solution to precipitate mucochloric acid, separating the precipitate from the mother liquor in said portion, and reintroducing said mother liquor into said reaction zone for further processing.

3. A continuous process for the preparation of mucochloric acid which comprises conjointly passing gaseous chlorine and furfural in a molar ratio of at least 6 to 1 into an aqueous hydrochloric acid solution in a reaction zone at a temperature of from about 40 to 110° C., said furfural and chlorine gas being introduced below the surface of said hydrochloric acid solution, withdrawing between about 5 to 15 percent of the resulting solution from said reaction zone and cooling to a temperature whereby mucochloric acid crystals are formed, removing the mucochloric acid crystals from said solution portion, and recycling the remaining solution portion to the reaction zone for further processing.

References Cited in the file of this patent
UNITED STATES PATENTS 2,588,852    Kuh _____ Mar. 11, 1952

OTHER REFERENCES

Beattie et al.: Journal Chem. Soc. (London), 1932, p. 264.
Leder: Chem. Centr., 1937, vol. II, p. 288.
Dunlop et al.: The Furans, 1953, p. 393.